Patented Jan. 15, 1924.

1,481,039

UNITED STATES PATENT OFFICE.

MAURICE C. TAYLOR, CHARLES A. GAMMAL, AND RALPH E. GEGENHEIMER, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF HYPOCHLORITES.

No Drawing.   Application filed March 25, 1922.   Serial No. 546,854.

*To all whom it may concern:*

Be it known that we, MAURICE C. TAYLOR, CHARLES A. GAMMAL, and RALPH E. GEGENHEIMER, citizens of the United States, residing at Niagara Falls, county of Niagara, State of New York, have invented certain new and useful Improvements in the Manufacture of Hypochlorites; and we do hereby declare the following to be a full, clear, and exact description of the invention, such as will enable others skilled in the art to which it appertains to make and use the same.

This invention relates to improvements in the manufacture of hypochlorites and includes, as a new product, a new calcium hypochlorite product as well as improvements in processes of producing the new calcium hypochlorite and similar products and improvements in certain novel steps of the process.

Bleaching powder has been a well known article of commerce for many years and is the most commonly used bleaching agent. It is often referred to as calcium hypochlorite, but this designation is incorrect, inasmuch as investigations of the composition of bleaching powder indicate that it has a more complex composition, containing a part of its chlorine as chloride chlorine (i. e. chlorine not attached to oxygen) and a part of its chlorine in the form of hypochlorite chlorine (attached to oxygen). There is also evidence to indicate that lime may also be bound up in the molecule in the compounds present in bleaching powder.

Calcium hypochlorite, although it may not be present in dry bleaching powder, is nevertheless formed when bleaching powder is dissolved in water, but it cannot be isolated by evaporation of such a solution as molecular compounds of calcium hypochlorite with calcium oxide and calcium chloride will again form. The presence of calcium chloride, which is inert as far as bleaching properties are concerned, is objectionable for the reason that it cuts down the effective bleaching value as compared with a product in which all of the chlorine is present in the form of hypochlorite chlorine. The presence of calcium chloride is further objectionable in that it decreases the stability of the bleaching powder.

Assuming bleaching powder to consist entirely of the molecular compound having the maximum available chlorine, expressed by the following formula:

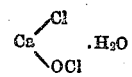

it would contain about 49 per cent of "available chlorine," according to the accepted method of expressing hypochlorite chlorine or "available chlorine" in terms of its oxidizing value. The bleaching powder of commerce averages about 35 per cent available chlorine and never exceeds about 40–42 per cent.

The present invention provides a calcium hypochlorite product which is made up essentially of calcium hypochlorite with a minimum amount of impurities, the product being associated with a small quantity of free lime, but being substantially free from chloride or the complex molecular compounds found in bleaching powder.

According to the present invention, this calcium hypochlorite product and hypochlorites of alkali forming or base forming metals, the alkalies and alkali earths are produced by a method which involves the extraction of hypochlorous acid from aqueous solutions, and the subsequent treatment of the hypochlorous acid thus extracted, with a base, e. g. lime, to produce calcium hypochlorite. The process is applicable to the production of other hypochlorites besides calcium hypochlorite. The process also includes certain novel steps for the production of intermediate products, as well as improvements in a cyclic process of a character hereinafter more fully set forth.

The complete process of the invention, as applied to the manufacture of calcium hypochlorite, comprises the following steps:—1. The preparation of an aqueous solution of hypochlorous acid containing chloride; 2, the extraction of hypochlorous acid from the aqueous solution without removal of chloride; 3, the reaction of the hypochlorous acid so extracted, with lime to form calcium hypochlorite; 4, the extraction of the calcium hypochlorite with water to form a concentrated aqueous solution; and 5, the evaporation of the aqueous solution to give the dry solid calcium hypochlorite.

The invention will be further illustrated by the following more detailed description:

The aqueous solution of hypochlorous acid may be prepared in any known or suitable manner, e. g., by methods based on the hydrolysis of chlorine according to the reaction $Cl_2 + H_2O \rightleftharpoons HOCl + HCl$. Hypochlorous acid may thus be made by adding chlorine to water in the presence of an alkaline substance which is hydrolyzed to such an extent that it will react with the hydrochloric acid formed by the hydrolysis of chlorin without reacting with the hypochlorous acid. Alkaline substances such as sodium bicarbonate or calcium carbonate can thus be used, the hydrochloric acid reacting with the alkali to form the corresponding chloride. We prefer to use ground limestone or precipitated chalk in the form of a suspension containing about 30 grams per litre, into which chlorine is passed while maintaining the temperature at about 0 to 5° C. In this way a solution of hypochlorous acid containing 10 to 20 grams of available chlorine per litre and some excess carbonate may be obtained. The solution will also contain the calcium chloride formed by the combination of the hydrochloric acid with the calcium carbonate.

After the solution of hypochlorous acid has been produced, it is treated to extract the hypochlorous acid from the solution and from the chlorides contained therein. This extraction, according to the present invention, is effected by treating the complex solution with a solvent or solvent mixture which will extract the hypochlorous acid without dissolving chlorides. The solvent mixtures which are particularly advantageous for this purpose are solvents, such as ether, chloroform, carbon tetrachloride tetrachlorethane, etc., which contain admixed therewith a small amount of an alcohol such as ethyl alcohol. While we do not desire to limit ourselves by any explanation of the action which takes place during this extraction, nevertheless when a small amount of alcohol is present in such immiscible solvents it appears to form compounds with the hypochlorous acid, which compounds are subsequently utilized by treatment with alkalies or alkali earths for the production of the corresponding hypochlorites. Instead of ethyl alcohol, other alcohols can be used, such as methyl, butyl and isopropyl alcohols, etc., which form similar compounds with hypochlorous acid. It may also be that the immiscible solvents themselves serve as solvents for the hypochlorous acid, and we do not accordingly wish to limit ourselves by any exact explanation of the action which takes place when the hypochlorous acid is thus extracted,—whether by true solution in the solvent or by the formation of compounds such as those with alcohols; but we use the term "solvent" to include solvent media which may form compounds with the hypochlorous acid and hold the hypochlorous acid in solution in this way.

Instead of using a solvent largely comprised of an ingredient immiscible with water for extracting the hypochlorous acid, alcohols alone may be used, for example, ethyl alcohol, which will combine with the hypochlorous acid and form a liquid product insoluble in water, which can be separated from the aqueous solution, either continuously or intermittently, e. g., by the use of a solvent immiscible in water, or by a current of air, or by gravity separation due to the different density of the immiscible liquid product formed, etc.

When the hypochlorous acid has been extracted it is obtained in a state substantially free from chlorides such that it can be made to react with alkalies and alkali earths for the production of hypochlorites of high purity, and advantage is taken of this property of the solution in making hypochlorites according to the present invention.

The production of a solution of hypochlorous acid suitable for use in the manner described will be further illustrated by the following example:—A suspension of calcium carbonate in water, which has been chlorinated so that the resulting solution contains 10–20 grams of available chlorine per liter, is treated with an equal volume of a solvent mixture comprising carbon tetrachloride containing 2% by volume of ethyl alcohol. The mixture is vigorously stirred for about five minutes while maintaining the temperature at about 0 to 5° C. The solvent layer is then allowed to separate and is withdrawn for subsequent treatment for the production of the hypochlorites.

The treatment of the solution with hydrated lime as the alkaline substance will be further illustrated by the following example:—Hydrated lime containing 1–3% free water is treated with the solvent containing extracted hypochlorous acid produced as above described and containing about one fourth of the theoretical amount of hypochlorous acid required to react completely with the amount of lime used. In order to induce maximum conversion of the lime and at the same time obtain a powdery product, water is added in such amounts that the total free water present amounts to from about one and one half to two times the theoretical amount of water required to yield the trihydrate of calcium hypochlorite,—$Ca(OCl)_2 \cdot 3H_2O$,—assuming that all of the hypochlorous acid present is going to react. In this way a product is obtained containing about 50% calcium hydroxide, about 25% water and about 25% calcium hypochlorite. Such a product contains about 25% "available chlorine."

In order to obtain substantially pure hypochlorite the mixture above described can advantageously be treated with water, thereby dissolving the calcium hypochlorite but relatively little lime, since lime is only slightly soluble in a strong solution of calcium hypochlorite. This aqueous solution may then be evaporated in any suitable manner, for example, by means of a vacuum evaporator of a type whereby a thin film of the solution is brought quickly to the required temperature and the solid resulting removed from the heated zone as quickly as possible. In this way a dry solid calcium hypochlorite product can be produced containing about 90 to 95% of calcium hypochlorite, the remainder consisting of free lime with some water and calcium chloride.

The calcium hypochlorite product thus produced we consider to be a new product in that it is made up essentially of calcium hypochlorite and is free from appreciable amounts of calcium chloride and is characterized by improved stability.

The product produced by the treatment of lime with the extract is likewise a new product even though it may contain a considerable amount of free lime, and it is distinguished from bleaching powder, even when its contents of available chlorine may be the same, for the reason that the balance is largely lime and not calcium chloride and that it does not contain the large amounts of molecular compounds containing calcium chloride and calcium hydroxide which are known to exist in bleaching powder.

When a solvent largely comprised of an ingredient immiscible with water is utilized for extracting the hypochlorous acid from its aqueous solution,—for example, a solvent such as above described which contains a small amount of alcohol,—this solvent can be advantageously employed in a cyclic manner, which has the advantage that the same solvent is used over and over again for extracting the hypochlorous acid from its aqueous solution and for reaction with the alkaline substance to form a hypochlorite. Such a solution of hypochlorous acid, or the compound of hypochlorous acid formed by action on the solvent as described above, will readily react with an alkali or alkali earths, with formation of the hypochlorite of the metal. The solvent can then be returned to the process to act again as a solvent and carrier of the hypochlorous acid. The rate and completeness of the reaction of the solvent containing hypochlorous acid with lime varies with the amount of water present. With the solvents that have been investigated and under the conditions of the investigation, all of the alkali or alkali earths employed has not been completely converted into hypochlorite, since, when the concentration has reached a certain amount, the reaction slows down or stops altogether, so that the reaction product is a mixture of hypochlorite and free base. By employing a smaller amount of the alkaline substance, and a correspondingly larger amount or excess of the extract, a more complete conversion of the base to hypochlorite can be effected. So also, the treatment of the base with the extract can be carried out on the countercurrent principle so that the base which has partly reacted with the extracted hypochlorous acid will be treated with the fresh and stronger extract, and the fresh base will serve to form further amounts of hypochlorites from the weaker extract. The presence of some of the extracted hypochlorous acid in the solvent is not, however, objectionable when the solvent is used in a cyclic manner, inasmuch as this extracted hypochlorous acid will be recovered during a subsequent treatment.

It will thus be seen that the present invention provides an improved method of producing hypochlorites in which hypochlorous acid is removed from an aqueous solution by means of a solvent or reagent which will not remove chlorides, and in which the hypochlorous acid thus extracted is treated with a base, such as an alkali or alkali earth, to form the hypochlorite. It will further be seen that the particular method of extracting the hypochlorous acid from the aqueous solution is capable of some variation, the separation being effected by means of a solvent or a reagent which will dissolve or combine with the hypochlorous acid and remove it from aqueous solution without removing the chlorides, such solvents being, for example, ethylene chloride, ether, carbon tetrachloride, etc., and especially any of these or other solvents together with a relatively small amount of some material such as alcohols, which will form a compound with hypochlorous acid, or the solution may be treated with alcohols alone. The solutions or compounds thus formed are of such a character that they will readily react with alkalies or alkali earths to form the corresponding hypochlorites.

We claim:

1. The method of producing hypochlorites which comprises extracting hypochlorous acid from its aqueous solutions with a reagent which will not extract chlorides, and causing the extracted hypochlorous acid to react with an alkaline substance to form the corresponding hypochlorite.

2. The method of producing hypochlorites which comprises removing hypochlorous acid from aqueous solutions by means of a solvent largely comprised of an ingredient immiscible with water and subsequently treating the resulting solution with an alkaline hydroxide to form the corresponding hypochlorite.

3. The method of producing hypochlorites which comprises treating an aqueous solution or suspension of alkaline substances with chlorine to form a solution containing hypochlorous acid and chlorides, extracting the hypochlorous acid from the aqueous solution without removal of chlorides and causing the extract to react with an alkaline hydroxide to form the corresponding hypochlorite.

4. The method of extracting hypochlorous acid from aqueous solutions which comprises treating such solutions with a solvent with which hypochlorous acid will combine to form an extract which will react with an alkali to give up hypochlorous acid and form a hypochlorite.

5. The method of extracting hypochlorous acid from aqueous solutions which comprises treating such solutions with a solvent immiscible with water, said solvent containing a small amount of an alcohol which will combine with the hypochlorous acid.

6. The method of producing hypochlorites which comprises extracting hypochlorous acid from aqueous solutions with a solvent largely comprised of an ingredient immiscible with water and treating the resulting solution with an alkaline hydroxide to form the corresponding hypochlorite, the solvent being returned to the process for extracting further amounts of hypochlorous acid.

7. The method of producing hypochlorous acid and its compounds which comprises causing chlorine to react with aqueous solutions or suspensions of alkaline substances to form aqueous solutions containing hypochlorous acid and chlorides, and extracting the hypochlorous acid from such aqueous solutions with a reagent which will extract the hypochlorous acid without extracting the chlorides.

8. The method of producing hypochlorous acid compounds which comprises causing chlorine to react with aqueous solutions or suspensions of alkaline substances to form aqueous solutions containing hypochlorous acid and chlorides, extracting the hypochlorous acid from such aqueous solutions without removing chlorides and causing the extract to react with alkaline hydroxides to form corresponding hypochlorites.

9. The method of producing calcium hypochlorite which comprises forming an aqueous solution of hypochlorous acid containing chlorides, separating the hypochlorous acid from such aqueous solutions without separating the chlorides, and combining the extracted hypochlorous acid with hydrated lime to form calcium hypochlorite.

10. The method of producing calcium hypochlorite which comprises forming an aqueous solution of hypochlorous acid containing chlorides, separating the hypochlorous acid from such aqueous solutions without separating the chlorides, combining the extracted hypochlorous acid with hydrated lime to form calcium hypochlorite, and extracting the calcium hypochlorite from unchanged lime to give a solution consisting essentially of calcium hypochlorite.

11. The method of producing calcium hypochlorite which comprises forming an aqueous solution of hypochlorous acid containing chlorides, separating the hypochlorous acid from such aqueous solutions without separating the chlorides, combining the extracted hypochlorous acid with hydrated lime to form calcium hypochlorite, extracting the calcium hypochlorite from unchanged lime to give a solution consisting essentially of calcium hypochlorite, and evaporating the resulting solutions to give the calcium hypochlorite in solid form.

12. The method of producing calcium hypochlorite which comprises extracting hypochlorous acid from aqueous solutions with a solvent largely comprised of an ingredient immiscible with water and treating the resulting solution with hydrated lime to form calcium hypochlorite.

13. The method of producing calcium hypochlorite which comprises extracting hypochlorous acid from aqueous solutions with a solvent largely comprised of an ingredient immiscible with water and treating the resulting solution with hydrated lime to form calcium hypochlorite, extracting the calcium hypochlorite with water to form a concentrated aqueous solution, thereby separating it from excess lime, and evaporating the aqueous solution to give the calcium hypochlorite in a dry solid form.

14. The method of producing calcium hypochlorite which comprises extracting hypochlorous acid from aqueous solutions with a solvent largely comprised of an ingredient immiscible with water, treating the resulting solution with hydrated lime to form calcium hypochlorite with the hypochlorous acid so extracted, and returning the solvent for extracting further amounts of hypochlorous acid in a cyclic manner.

15. The method of extracting hypochlorous acid from aqueous solutions which comprises treating such solutions with a solvent immiscible with water containing a reagent with which hypochlorous acid will combine to form an extract which will react with an alkali to give up hypochlorous acid and form a hypochlorite.

16. The method of extracting hypochlorous acid from aqueous solutions which comprises treating such solutions with a reagent which will extract hypochlorous acid without extracting chlorides in admixture with a solvent immiscible with water which will dissolve the extract to form an extract which will react with an alkali to give up hypochlorous acid and form a hypochlorite.

17. The method of extracting hypochlorous acid from aqueous solutions which comprises treating such solutions with a solvent medium which forms an extract of hypochlorous acid immiscible with water which will react with an alkali to give up hypochlorous acid and form a hypochlorite.

18. The method of extracting hypochlorous acid from aqueous solutions which comprises treating such solutions with a reagent which forms a compound of hypochlorous acid immiscible with water which will react with an alkali to give up hypochlorous acid and form a hypochlorite.

In testimony whereof we affix our signatures.

MAURICE C. TAYLOR.
CHARLES A. GAMMAL.
RALPH E. GEGENHEIMER.